United States Patent
Bush et al.

(10) Patent No.: US 10,938,689 B2
(45) Date of Patent: *Mar. 2, 2021

(54) SYSTEM AND METHOD FOR CONTEXT AWARE NETWORK FILTERING WITHIN AN AVIATION NETWORK

(71) Applicant: The Boeing Company, Chicago, IL (US)

(72) Inventors: John E. Bush, Bothell, WA (US); Steven L. Arnold, Kirkland, WA (US); Arun Ayyagari, Seatlle, WA (US)

(73) Assignee: The Boeing Company, Chicago, IL (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/054,924

(22) Filed: Aug. 3, 2018

(65) Prior Publication Data
US 2018/0375747 A1    Dec. 27, 2018

Related U.S. Application Data

(63) Continuation of application No. 15/095,973, filed on Apr. 11, 2016, now Pat. No. 10,063,435.

(51) Int. Cl.
*G06F 21/00* (2013.01)
*H04L 9/00* (2006.01)
(Continued)

(52) U.S. Cl.
CPC .......... *H04L 43/08* (2013.01); *H04L 43/028* (2013.01); *H04L 45/70* (2013.01); *H04L 63/02* (2013.01);
(Continued)

(58) Field of Classification Search
CPC ................ H04L 63/0227; H04L 67/12; H04L 2012/4028; H04L 63/0245
See application file for complete search history.

(56) References Cited

U.S. PATENT DOCUMENTS 7,013,482 B1    3/2006  Krumel
7,779,458 B1    8/2010  Heiderscheit et al.
(Continued)

FOREIGN PATENT DOCUMENTS

CN    101834751 A    9/2010
CN    101836422 A    9/2010
(Continued)

OTHER PUBLICATIONS

"Canadian Application Serial No. 2,955,737, Office Action dated Oct. 22, 2019", 4 pgs.
(Continued)

*Primary Examiner* — Alexander Lagor
(74) *Attorney, Agent, or Firm* — Kwan & Olynick LLP

(57) ABSTRACT

In general, certain embodiments of the present disclosure provide techniques or mechanisms for automatically filtering network messages in an aviation network for an aircraft based on a current system context. According to various embodiments, a method is provided comprising receiving a network message transmitted from a source avionic device to a destination avionic device via one or more network packets within the aviation network. A current system context, indicating an aggregate status of avionic devices within the aviation network, is determined based on monitoring the avionic devices. The network message is analyzed by identifying a plurality of attributes corresponding to header and data fields of the one or more network packets corresponding to the network message. The acceptability of the network message within the current system context is determined based on one or more filter rules that specify what attributes are allowed within a particular system context.

20 Claims, 10 Drawing Sheets

(51) Int. Cl.
*H04L 12/26* (2006.01)
*H04L 29/06* (2006.01)
*H04L 12/721* (2013.01)

(52) U.S. Cl.
CPC .......... *H04L 63/1433* (2013.01); *H04L 63/20* (2013.01); *H04L 69/22* (2013.01)

(56) References Cited

U.S. PATENT DOCUMENTS

| | | | |
|---|---|---|---|
| 8,397,286 B2 * | 3/2013 | Declety | H04L 63/0209 726/13 |
| 8,762,990 B2 | 6/2014 | Angus | |
| 8,989,958 B2 | 3/2015 | Ric et al. | |
| 9,413,783 B1 * | 8/2016 | Keogh | H04L 63/1458 |
| 10,063,435 B2 | 8/2018 | Bush et al. | |
| 2006/0130134 A1 | 6/2006 | Colas et al. | |
| 2010/0318794 A1 | 12/2010 | Dierickx | |
| 2014/0032800 A1 | 1/2014 | Peirce et al. | |
| 2015/0121450 A1 * | 4/2015 | Chen | H04L 63/0227 726/1 |
| 2015/0295780 A1 * | 10/2015 | Hsiao | H04L 43/022 715/736 |
| 2017/0295031 A1 | 10/2017 | Bush et al. | |

FOREIGN PATENT DOCUMENTS

| | | |
|---|---|---|
| CN | 104683142 A | 6/2015 |
| CN | 104838602 A | 8/2015 |
| CN | 104901874 A | 9/2015 |
| WO | 2013144962 A1 | 10/2013 |

OTHER PUBLICATIONS

"U.S. Appl. No. 15/095,973, Non Final Office Action dated Nov. 15, 2017", 18 pgs.

"U.S. Appl. No. 15/095,973, Notice of Allowance dated Apr. 26, 2018", 9 pages.

"European Application Serial No. 17165846.1, Search Report dated Jul. 24, 2017", 10 pgs.

Tanenbaum, Andrew S. et al., "Computer Networks", Computer Networks, 5th edition, 2011, 6 pgs.

Chinese Application Serial No. 201710187421.3, Office Action dated Nov. 16, 2020, 17 pgs.

* cited by examiner

SYSTEM AND METHOD FOR CONTEXT AWARE NETWORK FILTERING WITHIN AN AVIATION NETWORK

CROSS-REFERENCE TO RELATED APPLICATIONS

This application is a continuation of U.S. patent application Ser. No. 15/095,973, filed on Apr. 11, 2016, which is incorporated herein by reference in its entirety for all purposes.

TECHNICAL FIELD

The present disclosure relates generally to cyber-security, and, more specifically, to methods and systems for use in identifying cyber-security threats to aviation platforms and infrastructures.

BACKGROUND

The e-Enabling of the aviation platforms and infrastructures, both onboard and off-board, have resulted in interconnected physical systems and supply chain infrastructures that are now a potential target for the dynamic and growing cyber security threats due to greater access to the networked computing systems. Aviation platforms and infrastructures are complex systems that involve hierarchically networked, embedded systems and controllers with varying operational criticality, reliability, and availability requirements. In various embodiments, embedded systems and controllers are increasingly hosted on general purpose computing devices hardware, commercial software operating systems, and specific custom applications performing the intended system functions. These onboard embedded systems and controllers may be networked via Internet Engineering Task Force (IETF) and Aeronautical Radio, Inc. (ARINC) standards based protocols such as the Internet Protocol (IP) and Institute of Electrical and Electronics Engineers (IEEE) wired and wireless communications and networking protocols. In addition, the onboard systems may be networked with off-board computing systems via standard IETF IP based protocols such as User Datagram Protocol (UDP) and Transmission Control Program (TCP).

The increased use of standards based computing and communication protocols may allow for seamless integration of the e-Enabled architecture, but may also increases the vulnerability to cyber security attacks. Furthermore, the current definition of airplane network data flows is not in a machine understandable form requiring manual interpretation for the creation of network filter rules suitable for a domain guard use. This can lead to errors and coverage gaps. Thus, there is a need for system and method for increased filter capabilities that can prevent unauthorized network flows based on changing system contexts on e-Enabled aviation platforms.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for context aware message content filtering of functional network flows for e-Enabled aviation platforms and infrastructures. According to various embodiments, a method for automatically filtering network messages in an aviation network for an aircraft based on a current system context is provided. The method comprises receiving a network message by a processor of a computer system. The network message is transmitted from a source avionic device to a destination avionic device via one or more network packets within the aviation network. The method further comprises establishing, by the processor, a current system context based on monitoring one or more avionic devices within the aviation network. In some embodiments, the system context indicates an aggregate status of the one or more avionic devices. In some embodiments, the current system context may include a combination of one or more of the following: a date, a time, a location of the source avionic device, a location of the destination avionic device, a device state of the plurality of avionic devices, and a flight phase of the aircraft. In some embodiments, the device state of the plurality of avionic devices may include an operational mode, a maintenance mode, or a data load mode. In some embodiments, the flight phase of the aircraft may include one or more of the following operational states: power on, pre-flight, engine start, in-gate, taxi-out, takeoff, initial climb, climb, enroute cruise, descent, approach land, rollout, taxi-in, go around, and engine shutdown.

The method further comprises analyzing an acceptability of the network message by the processor. The acceptability of the network message is analyzed by identifying a plurality of attributes corresponding to the network message. In some embodiments, the plurality of attributes correspond to header and data fields of the one or more network packets corresponding to the network message. In some embodiments, the plurality of attributes corresponding to the network message include one or more of the following: a destination address, a source address, a flight phase of the network message, a device state of the network message, a function, a sub-function, a data flow, and a protocol.

The acceptability of the network message is further analyzed by determining the acceptability of the network message within the system context based on one or more filter rules that specify what attributes are allowed within a particular system context. In some embodiments, the one or more filter rules are automatically generated during a testing phase of the aviation network by capturing one or more test network packets corresponding to a test functional network flow transmitted within the aviation network. The one or more test network packets are parsed in order to extract one or more test network messages corresponding to the test functional network flow. The test network message of the one or more test network messages may then be examined in order to identify a plurality of test attributes. In some embodiments, the plurality of test attributes correspond to header and data fields of the one or more test network packets corresponding to the test network message. The plurality of test attributes of the test network message are then classified. The one or more filter rules are further automatically generated by automatically generating one or more tables corresponding to the one or more test network messages. The one or more tables include the one or more filter rules and are chained based on one or more test attributes of the test network messages. Finally, the one or more filter rules are validated.

In some embodiments, the one or more filter rules include one or more deep packet filtering rules that prevent unauthorized data flows on the aviation network by examining one or more payloads of the one or more network packets. The method further comprises forwarding, by the processor, the network message to the destination avionic device if the network message is determined to be acceptable within the system context.

In yet a further embodiment, a system is provided comprising one or more processors, memory, one or more processors, and one or more programs stored in the memory. In yet another embodiment, a non-transitory computer readable medium is provided comprising one or more programs configured for execution by a computer system. In various embodiments, the one or more programs include instructions for receiving a network message by a processor of a computer system. The network message is transmitted from a source avionic device to a destination avionic device via one or more network packets within an aviation network. The one or more programs further include instructions for establishing, by the processor, a current system context based on monitoring one or more avionic devices in the aviation network. In some embodiments, the system context indicates an aggregate status of the one or more avionic devices. The one or more programs further include instructions for analyzing an acceptability of the network message by the processor. The acceptability of the network message is analyzed by identifying a plurality of attributes corresponding to the network message. In some embodiments, the plurality of attributes correspond to header and data fields of the one or more network packets corresponding to the network message. The acceptability of the network message is further analyzed by determining the acceptability of the network message within the system context based on one or more filter rules. In some embodiments, the filter rules specify what attributes are allowed within a particular system context. The one or more programs further include instructions for forwarding, by the processor, the network message to the destination avionic device if the network message is determined to be acceptable within the system context.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1A:
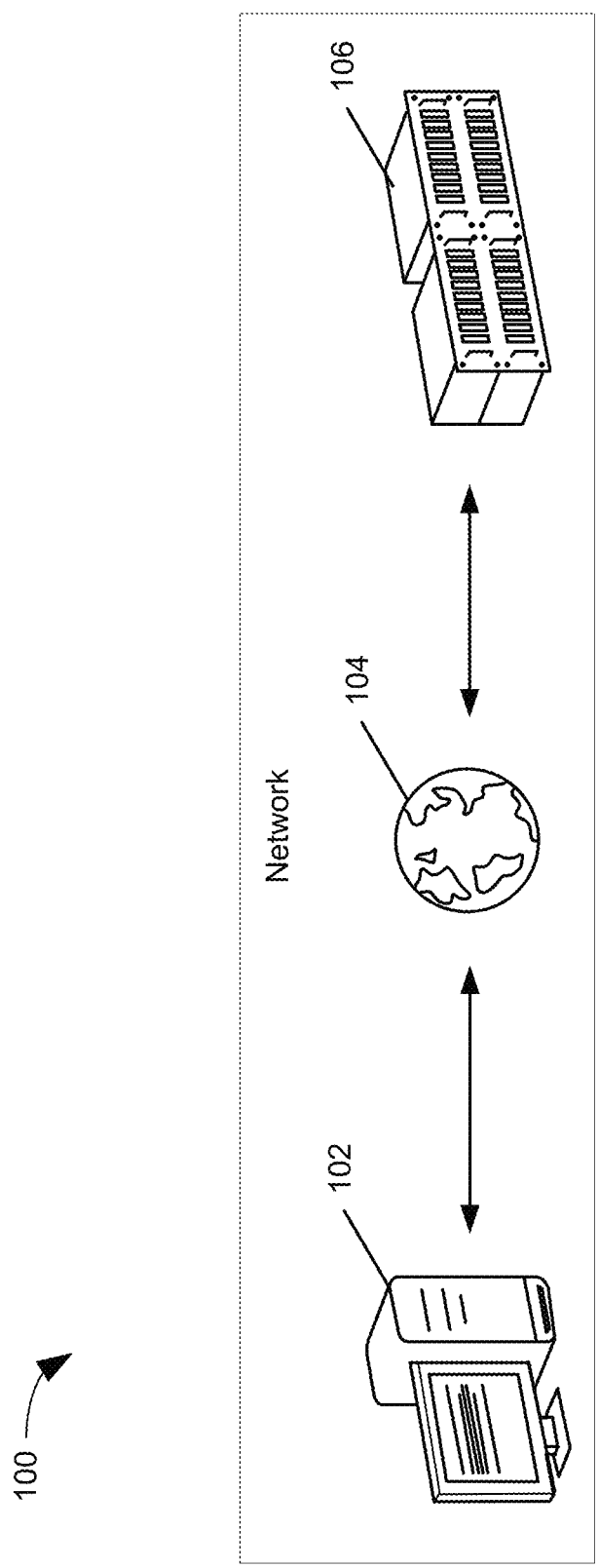
FIG. 1A illustrates a general overview of an example system for implementing various methods of the present disclosure, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of particular functions, sub-functions, and data flows of certain network messages. However, it should be noted that the techniques of the present disclosure apply to other network flows and/or protocols with various functions, sub-functions, and data flows. As another example, the techniques of the present disclosure will refer to particular devices and/or entities within an aviation network. As used herein, the terms "entity" and "device" may be used interchangeably to refer to one or more various avionic devices within an aviation network that transmit and/or receive network packets and/or network messages. However, it should be noted that the techniques of the present disclosure apply to devices of various other network and network types. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure provides a system and method for context aware message content filtering of functional network flows for e-Enabled aviation platforms and infrastructures. Network packets transmitted between various avionic devices in a networked avionic system may include one or more network messages. Such avionic devices may comprise various communication devices and/or computers within an aircraft, control center, etc. In some embodiments, the transmitted network message may be received by a computer system acting as a firewall filter. The computer system may determine a current context of the networked aviation system based on monitoring one or more avionic devices within the networked aviation system for status information such as the location, device state, and/or flight phase of the avionic devices. The current context of the system may also include the current date and time.

Based on this current context, the computer system can determine the acceptability of the received network message based on filter rules specifying what attributes are allowed within a particular system context. The computer system identifies attributes of the network message by examining various header and data fields of the network packets corresponding to the network message through deep packet identification. The computer system then forwards the network message to the avionic device that is the destination entity if it is determined that the particular attributes of the received network message are acceptable within the current context of the networked aviation system. In this way, the computer system can enforce context based constraints on network messages transmitted within the networked aviation system.

EXAMPLE EMBODIMENTS

FIG. 1A illustrates a general overview of an example system 100 for implementing various methods of the present disclosure, in accordance with one or more embodiments. In particular, FIG. 1A describes a user accessing a network 104 using a computer 102 configured with a web browser to interact with another computer 106. In some embodiments, computer 106 may be configured as a server containing modules required for fulfilling the user's request. In some embodiments, computers 102 and/or 106 may be general purpose computers. In other embodiments, computers 102 and/or 106 may be specialized avionic devices that include configurable controls and interface systems for operating in a networked aviation system, platform, and/or architecture. In other embodiments, system 100 may include other devices and/or computers connected to computers 102 and 106 via network 104. In some embodiments, network 104 may be an Ethernet connection and/or other standard internet and local area network (LAN) technologies, including IP and UDP. In other embodiments, network 104 may be any other direct and/or wireless network.

Figure 1B:
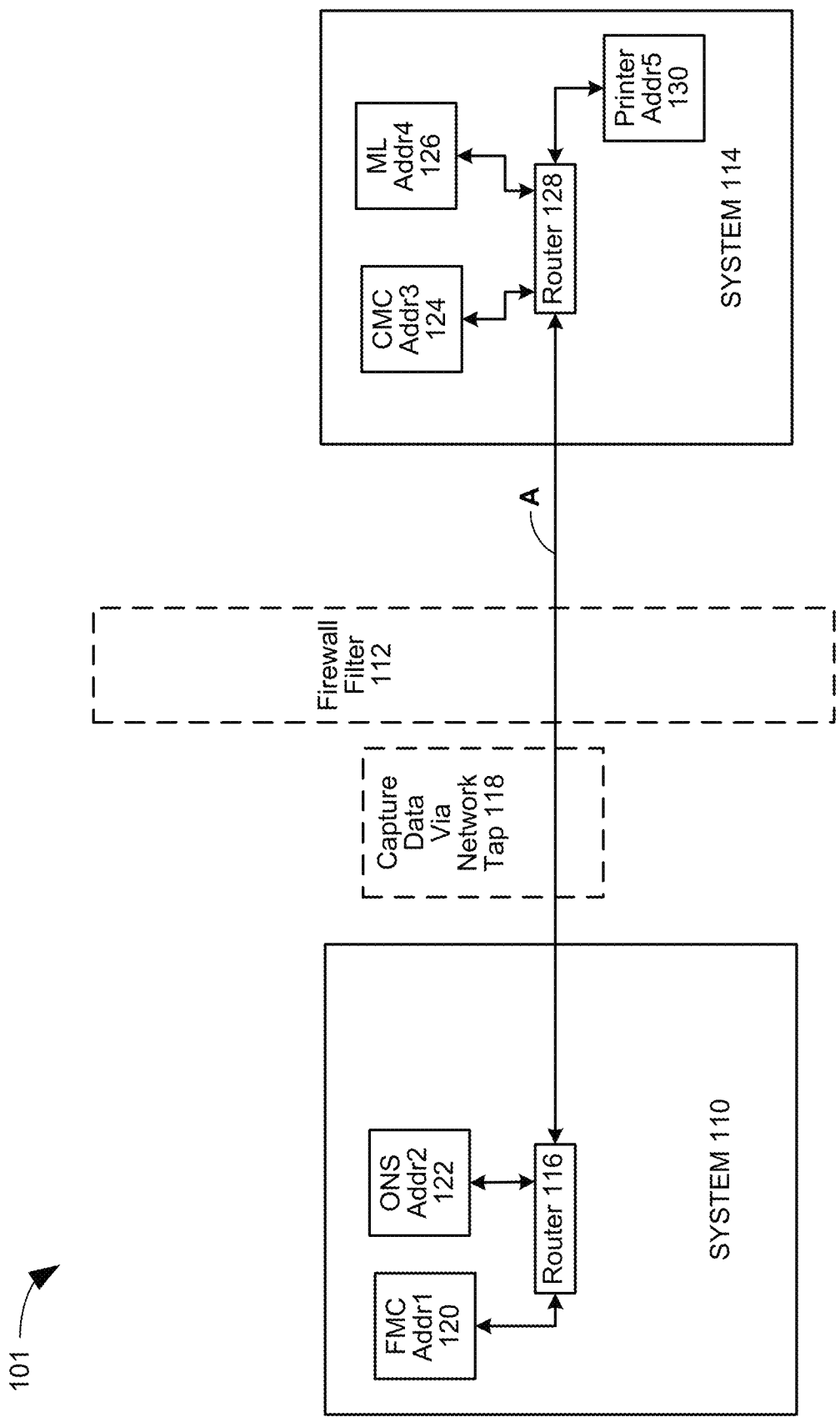
FIG. 1B illustrates an example system for context aware message filtering, in accordance with one or more embodiments.

FIG. 1B shows an example system architecture 101 for capturing network packets, according to one or more embodiments of the present disclosure. Two systems, system 110 and system 114, are connected via an Ethernet connection, such as network 104. Each system (110 or 114) could be a computer system including computers 102 or 106, or avionics systems like single line replaceable unit (LRU) or a collection of LRUs. An LRU may comprise a modular component of an airplane, ship, or spacecraft (or any other manufactured avionic device) that is designed to be replaced quickly at an operating location. An LRU may be a sealed unit such as a radio or other auxiliary equipment. For example, system 110 and/or system 114 may be communication components and/or computers of an aircraft, a satellite, a control tower, a cellular tower, other off-board systems that communicate with in-aircraft networks, and/or simulations thereof. FIG. 1B shows system 110 made up of a Flight Management Computer 120 (FMC) and an On Board Network System 122 (ONS) communicating through a router 116. System 114 is made up of three LRUs including a Central Maintenance computer 124 (CMC), Maintenance Laptop 126 (ML) and a Printer 130 communicating through a router 128.

One of the purposes of the present disclosure is to provide a means to automatically create the firewall filter rules for firewall 112 to control the flow of information between system 110 and system 114. The connection between system 110 and system 114 over network 104 is depicted by arrow A. In various embodiments, data transferred between system 110 and system 114 may be captured by a network tap 118 anywhere along arrow A by monitoring the connection between system 110 and system 114. In various embodiments, the data may be captured by another computer connected to network 104, such as computers 104 and/or 106. In certain embodiments, data may be captured by various methods, including, but not limited to, packet capture ("PCAP") software to record all of the data packets transmitted between system 110 and system 114. The data packets include one or more network messages. Once captured, the data packets may then be parsed, examined, classified, and grouped into functional network flows in order to create filter rules for firewall 112 to control the flow of information between system 110 and system 114, as will be further described below. A functional network flow may correspond to a group of network messages which corresponds to a higher level airplane function, sub=function, data flow, and protocol.

The functional flows of major airplane functions like flight management, printing, data loader, or central maintenance might contain sub-functions which can also be described as different data flows. In some embodiments, the data flows are either a temporal or protocol exchange. Example functional flows used to illustrate this disclosure process include:
  1. Dataload (protocol)
     a. IEEE 802.1× authentication/connection
     b. Establishing the ARINC 615A session
     c. Performing Data load operation utilizing the Trivial File Transfer Protocol (TFTP) protocol
     d. Closing the ARINC 615A session
  2. Printer job (Protocol)
  3. Central Maintenance computing functions (CMCF)
     a. Continuous (Build In Test Equipment) BITE reporting which does not establish a session (temporal)
     b. Query of LRU configuration report from CMCF (Protocol)

Figure 2:
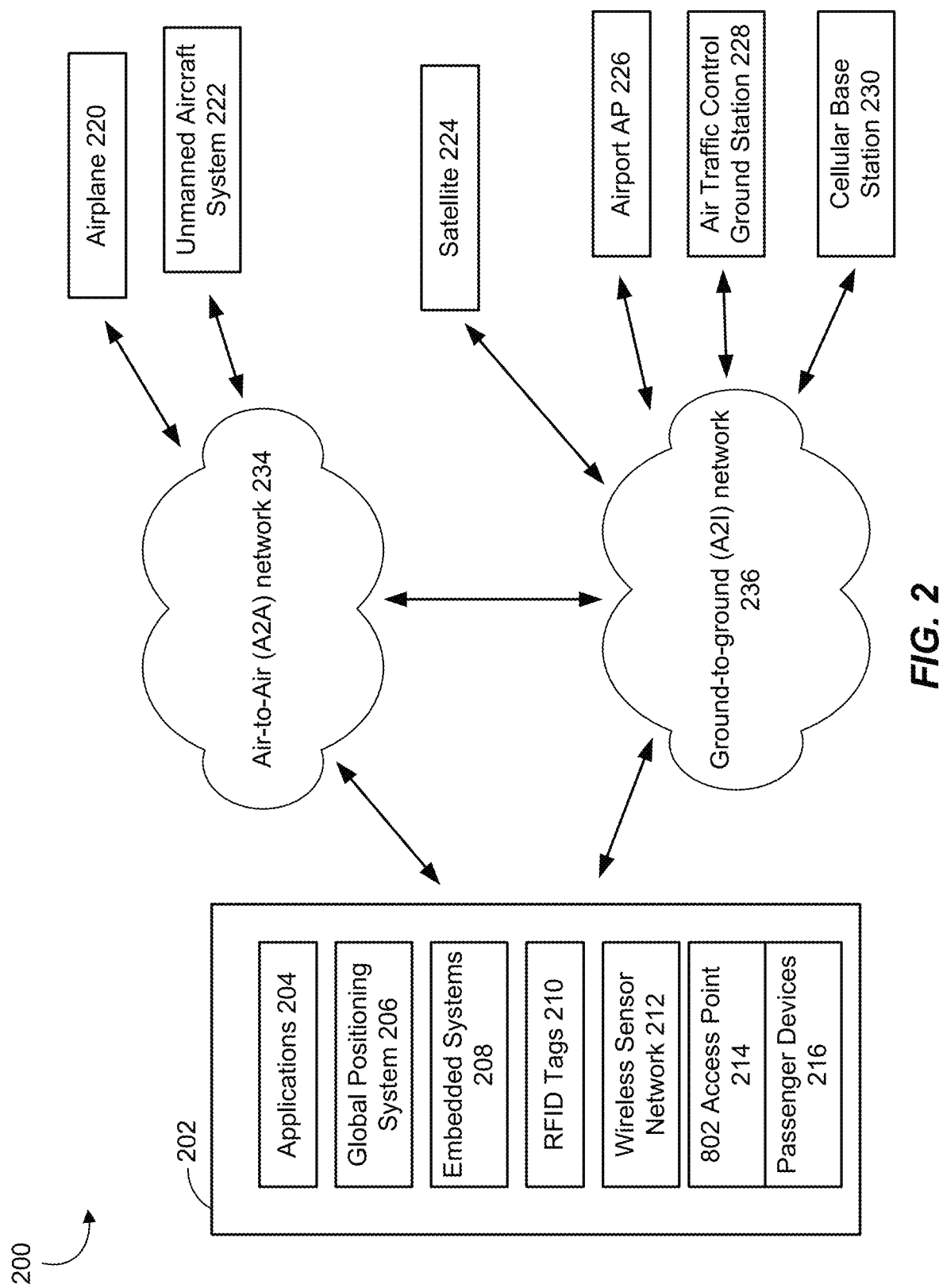
FIG. 2 illustrates an example of an e-Enabled aviation platform, in accordance with one or more embodiments.

FIG. 2 illustrates an example of an e-Enabled aviation platform 200 that may be implemented in conjunction with the techniques and mechanisms of the present disclosure in accordance with one or more embodiments. Aviation platforms and infrastructures are rapidly adopting e-Enabled architectures and technologies to take advantage of the operational and performance efficiencies that result from being networked. In various embodiments of platform 200, an e-Enabled aircraft 202 may be connected to various entities through an aircraft to aircraft (A2A) network 234 and/or an aircraft to ground (A2I) network 236. In sonic embodiments, aircraft 202 may include various in-aircraft network systems with corresponding communication radios including global position system (GPS) 206, embedded systems 208, radio frequency identification (RFID) tags 210, wireless sensor network 212, 802.11 access points 214, and passenger devices 216. In some embodiments, aircraft 202 may also include applications 204 which integrate the multiple data sources between airplane 202 and ground systems. In some embodiments, the data sources may carry information corresponding to loadable software (e.g., navigation databases, electronic flight bag, weather reports), health data (e.g., wireless sensor and tag data, diagnostics), and traffic control data (e.g., traffic beacons). In some embodiments, the aircraft network systems may be systems 110 and 114, and may include computers and/or servers, such as computers 102 and 106. In some embodiments, applications 204 may be located on computers, such as computers 102 and 106, and systems, such as systems 110 and 114. In some embodiments, the in-aircraft network systems may include a secure data network that is secured by a firewall, such as firewall filter 112.

In some embodiments, the e-enabled airplane 202 may have multiple entities communicating with it for each application, including: e-commerce merchants, airplane manufacturers, onboard equipment suppliers, airlines, aeronautical and other network service providers, servicers (for maintenance), air traffic control (ATC) centers, regulatory agencies (e.g., the Federal Aviation Administration), and other airplanes, such as airplane 220 and unmanned aircraft 222. For example, the in-aircraft network systems may send information to and/or receive information from another airplane 220 and/or unmanned aircraft system 222 via A2A network 234. Such information may include an Automatic Dependent Surveillance-Broadcast (ADS-B) based on 1090 MHz Extended Squitter link or other beacons for identifying and tracking aircraft. For example, using an ADS-B datalink, each aircraft 202, 220, and 222 may automatically transmit its precise position, its velocity (both vertically and horizontally), as well as its altitude and other information to controllers and other nearby aircraft.

Similarly, the in-aircraft network systems may send information to and/or receive information from airline infrastructure entities by communicating with satellite 224, airport access point 226, air traffic control (ATC) ground station 228, and/or cellular base station 230, via A2I network 236. In some embodiments, A2I links with airline infrastructure entities can be via a broadband satellite (via SATCOM when the airplane is in-the-air or a 802.11 link when on-the-ground. In some embodiments, an ATC center may transmit beacons, traffic information, and/or other navigational information via air traffic control ground station 228. In some embodiments, communications with the ATC ground stations may be via aeronautical protocols over satellite or terrestrial radio links. ADS-B may provide an additional Mode S radio link with the ATC centers. In some embodiments, third party providers may provide internet, broadband, and other services via cellular base station 230.

The e-Enabling of the aviation platforms and infrastructures, both onboard and off-board, have resulted in interconnected physical systems and supply chain infrastructures that are now a potential target for the dynamic and growing cyber security threats due to greater access to the networked computing systems. Aviation platforms and infrastructures are complex systems that involve hierarchically networked, embedded systems and controllers with varying operational criticality, reliability, and availability requirements. Furthermore, embedded systems and controllers are increasingly hosted on general purpose computing hardware, commercial software operating systems, and specific custom applications performing the intended system functions. These onboard embedded systems and controllers are networked via IETF and ARINC standards based protocols such as IP and IEEE wired and wireless communications and networking protocols. In addition, the onboard systems are network with off-board computing systems via standard IETF IP based protocols such as UDP and TCP. The increased use of standards based computing and communication protocols allow for seamless integration of the e-Enabled architecture but also increases the vulnerability to cyber security attacks.

In various embodiments, some entities connected in the e-Enabled aviation platform 200 may be trusted entities and some entities may be entrusted entities. Thus, it is important to prevent unauthorized data flows on such e-Enabled aviation platforms and filter the information and/or communications based on the context of the system, including the flight phase, location of aircraft, time, and location.

Figure 3A:
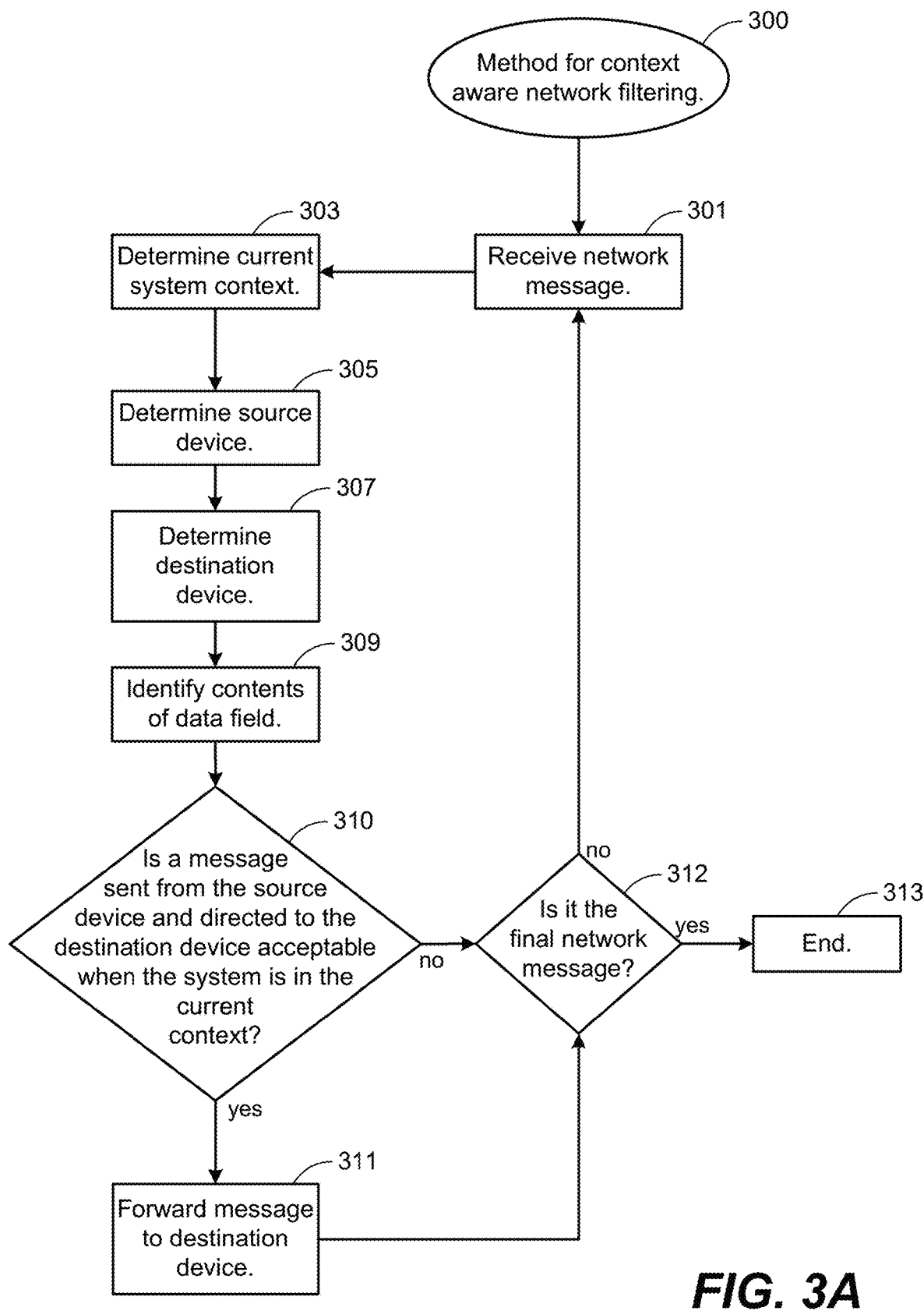
FIG. 3A illustrates an example of a method for context aware network filtering, in accordance with one or more embodiments.

FIG. 3A illustrates an example method 300 for context aware network filtering, in accordance with one or more embodiments. At step 301, a network message is received. In some embodiments, a network message may be transmitted between devices in a system, such as system 100 and/or 101, via one or more network packets within a network flow. In some embodiments, a functional network flow may be a sequence of packets from a source to a destination, which may be a host, a multicast group, or a broadcast domain. In some embodiments, a functional network flow may be uniquely identified by the following parameters within a certain time period: source and destination IP address, source and destination port, and layer 4 protocol. In various embodiments, the functional network flows may come from various different sources, such as system 110 and/or system 114.

At step 303, the current system context is determined. In some embodiments, the current system context may correspond to a particular flight phase. In some embodiments, the system context may be determined based on captured network messages that are flight phase messages that indicate the particular flight phase. In other embodiments, the current system context may be based on other measurements and may be determined based on other information received from various systems and devices. In various embodiments, the system context may comprise one or more of the following: location, date, time, device state, and flight phase. The location of the system, such as system 100 and/or 101, may be determined by global position system (GPS) or other means of geolocation including radio frequency (RF) location methods, such as Time Difference Of Arrival (TDOA), triangulation by cellular towers, or internet and computer geolocation through association with IP address, MAC address RFID, etc. In various embodiments, device state of the system may include an operational mode, a maintenance mode, and/or a data load mode. In various embodiments, the system may additionally be in a particular flight phase, which may comprise one or more of the following operational states: power on, pre-flight, engine start, in-gate, taxi-out, takeoff, initial climb, climb, enroute cruise, descent, approach land, rollout, taxi-in, go around, and engine shutdown. For example, the system or aircraft may be in an operational mode during flight phases in which the aircraft away from the gate and/or in the air. Alternatively, if the aircraft is on the ground, the current system may be in maintenance mode. In some embodiments, an aircraft may be considered on the ground during one or more flight phases between the time the aircraft arrives at a terminal gate and the time it departs on its next flight. Such flight phases may include, but are not limited to, in-gate, engine shutdown, pre-flight, and engine start. In other embodiments, an aircraft may also be considered on the ground during other flight phases, such as taxi-in and taxi-out. In some embodiments, only typical maintenance actions are allowed when the system is in maintenance mode, such as downloading of shop fault data, queries for configuration information, and data load of new operational or configuration data into the line replaceable units (LRU).

In various embodiments, various other types of network messages and/or flows may be allowed and/or blocked over an e-Enabled platform depending on the different flight phases. For example, the pre-flight phase may include any activity involved with preparing the aircraft for departure, during which the crew must determine the airworthiness of the aircraft and address any open issues before departure. In some embodiments, the aircraft may have extensive autoflight capabilities that allow many of the navigation and performance optimization tasks to be handled automatically if desired. Autoflight initialization and Flight Management System (FMS) programming may be conducted during the pre-flight phase. In various embodiments, the required flight parameters are selected or programmed in the system during the pre-flight phase. Some airlines have information systems which allow information required to initialize the autoflight systems to be uploaded automatically via an ACARS (Aircraft Communication and Reporting System) datalink unit. ACARS typically utilizes a VHF datalink and alphanumeric interface to facilitate company-specific communications between the aircraft and a central Airline Operations Center (AOC).

During the pre-departure flight phase, the Captain, lead gate agent and ground crew chief coordinate their efforts to see that all pre-departure requirements are met, as the scheduled departure time approaches. The pilots may finalize the FMS and autoflight parameters by obtaining an update on weather conditions and runway utilization through the Airport Terminal Information Service (ATIS). In addition, the crew must receive confirmation of the flight's routing from ATC. Prior to the scheduled departure (usually at least a few hours before), the airline's dispatch office files a requested routing based on their flight plan optimization with ATC. Approximately 20 minutes prior to departure, the ATC route clearance is requested, preferably through the ACARS Pre-Departure Clearance (PDC) function. The ATC route clearance received by the crew may differ from the filed routing and the changes must be addressed (fuel/performance/dispatch considerations) and reprogrammed.

In addition to possible routing changes, ATC may also adjust the planned departure time as a result of current airspace dynamics. The ATC clearance may include a "gate hold" or expected "wheels-up" time due to traffic congestion, routing conflicts, or adverse weather conditions. In order to prepare the aircraft for movement, the ground crew completes the baggage and cargo loading, including late bags, and closes the cargo doors. Typically, the Captain communicates to the tug driver (or other ground crewmember) through an "interphone" link, while the First Officer communicates to ramp control and/or ATC via the VHF radio.

Anytime ground movement is initiated, permission must be received from the controlling authority, such as in the taxi-out phase. At some point before leaving the ramp area, the First Officer contacts ground control to get taxi clearance to the active runway. Operational considerations such as high take-off weight, may dictate the request for a special runway which can result in a taxi and/or take-off delay while ATC works out a modified sequence. During the taxi, the load closeout is received via ACARS or by VHF radio. In situations where there will be a long taxi due to numerous departures ahead in sequence for take-off, the Captain may make a PA announcement informing the passengers and cabin crew of his/her best estimate of the length of the delay. If the delay is significant, the company may have to be updated via ACARS or VHF radio with a new ETO (estimated time "OFF"). As the aircraft approaches the departure end of the runway, the Captain may make a departure PA announcement to inform the flight attendants that the take-off is imminent and they should secure themselves at their stations. A passenger briefing (video) may also be shown.

In various embodiments, network messages during the takeoff phase may include various communications from the control tower to the aircraft. For example, in order to make most efficient use of runway resources, the local tower controller often issues a "position and hold" clearance to an aircraft in preparation for final take-off clearance in order to allow the aircraft to taxi into position and hold on the departure runway while waiting for other traffic, runway restrictions, or an ATC (air traffic control) issued departure time. Alternatively, if this hold time is not required or a departure needs to be expedited, the tower may clear the flight for take-off without holding in position. As another example, adequate wake separation requirements must be assured by confirming that an acceptable interval of time has elapsed before commencing the take-off roll if the flight is following the departure of a large aircraft.

An uneventful take-off is typically followed by the climb phase. A normal initial climb-out includes "cleaning up" the aircraft (gear raised, flaps/slats retracted) while conforming to any noise and/or obstacle requirements. The dynamics of the flight environment, including accommodation of ATC directives, require the crew to continuously monitor aircraft performance in order to realize the best possible flight profile. At some point during the climb, the cockpit crew checks the FMS and/or performance charts to compare the optimal and maximum cruise altitudes with the planned data and desired cruise Mach. This information is used to coordinate an optimal cruise altitude with ATC. Other factors include wind data and ride (turbulence) conditions, enroute convective weather, Minimum Equipment List (MEL) contingencies, traffic-induced speed restrictions and fuel consumption issues. Passenger-related activities during the climb may include beginning the meal and/or beverage service, delivering any marketing PA announcements and activating any entertainment systems. In addition, the Captain usually makes a PA describing enroute flight time and weather conditions, points of interest, arrival estimate, destination weather and, if applicable, any information concerning the presence of an augmented crew and/or safety information.

In some embodiments, as cruise altitude is reached during the enroute cruise phase, the power settings and/or Mach target may be established, and the crews will report level to ATC. The crew also performs various administrative duties, including downlinking any departure delay ACARS codes and recording the engine monitor log (if not automated). The aircraft is usually equipped with at least 2 VHF transceivers and, if overwater certified, HF radios. VHF radio management usually requires one tuner to be set to the current ATC frequency, while the other is utilized for company communications or to maintain a listening watch on the universal emergency channel (121.5 MHz). Satellite communications (SATCOM) may be used where available for both ATC and company communications. SATCOM systems offer the benefit of worldwide communication coverage without the signal degradation, time-of-day variability, and other deficiencies associated with HF. In addition, when out of VHF contact with ground facilities, the crew typically maintains a listening watch on the air-to-air frequency of 123.45 MHz.

This channel may be used to pass along operational information such as ride reports and enroute weather directly between aircraft.

In other embodiments, the sources of information available for cruise level decision making include Pilot Reports (PIREP) from other flights, ATC, the crew's own experience, dispatch, and the flight plan. On international flights, transitioning through airspace boundaries under the jurisdiction of other national sovereignties may require supplementary procedures to address local restrictions. These FIR (Flight Information Region) boundaries normally require advance notification via the flight planning process (filed flight plan), and preliminary contact by the aircraft as the flight approaches the boundary. Generally, separate ATC clearances must be issued at each boundary crossing, including entering the oceanic airspace.

The need to deviate from the desired track due to adverse weather is always a possibility. Convective weather and thunderstorms may require deviations from planned routings, but this is facilitated through coordination with ATC in this VHF/radar environment. As in other phases of flight, the crew must be constantly prepared for the possibility of contingencies requiring diversion of the aircraft to an enroute alternate airport. In addition to the possible closure of the destination airport (due to weather, power outages, or other field situations), reasons for diverting include medical emergencies (sick passengers/crew), aircraft equipment problems, terrorist activities inflight, unacceptable holding times, fuel diversion due to wind or traffic delays.

During the descent phase, the initial descent may take place with about 30 to 40 minutes remaining in the flight, at which time the crew begins their approach and landing preparations. An "In Range" message is often transmitted to the destination station either through MARS or by VHF radio. This message includes the latest touchdown estimate, special passenger requests (wheelchairs/connections), and if not already transmitted, any maintenance discrepancies. The station transmits or uplinks the arrival gate assignment, ground power unit status and any other relevant status message such as a "tow-in only" requirement for the assigned gate. During the descent, ATC may issue crossing restrictions which can be part of a published standard arrival procedure, such as a Standard Terminal Arrival Route (STAR), or as a response to a traffic sequencing requirement. The FMS is the primary resource available to the crew for descent planning as restrictions can be programmed directly via the CDU and a profile calculated.

Destination weather and the expected approach/runway procedures are major considerations in planning the arrival. The primary source of this information is the Airport Terminal Information System (ATIS), although holding delays, weather conditions and runway operations may be passed along via. ATC and/or dispatch. ATIS provides the current weather, instrument approach procedures in use, and active runways, as well as details concerning runway and taxiway closures, windshear reports, precise visibility values for individual runways, braking capability, bird activity, temporary obstructions (e.g. construction), land and hold short operations (LAHSO) utilization and any other relevant safety-related information.

The aircraft operated by most air carriers are usually equipped to satisfy the navigation requirements of a variety of approach procedures for the approach phase. Precision approaches include Global Positioning System (GPS) autoland, GPS LNAV/VNAV and Category (CAT) I, II and III ILS approaches as previously described. Many runways at larger airports utilize the Instrument Landing System (ILS) to provide guidance to pilots during instrument conditions along a well-defined path made up of lateral and vertical elements called the localizer and glide slope respectively. A non-precision approach is a procedure where lateral track information is provided by a local navigation aid (navaid) or satellite, but vertical guidance is received through barometric referencing or other means not directly associated with the specific runway. As expected, precision approaches provide for operations in much lower ceiling and visibility conditions.

In the event the requirements for completing the approach and landing are not satisfied, the go-around phase may be executed and a standardized "missed approach procedure" and/or ATC instructions must be followed. Options available following a missed approach include entering holding to wait out whatever unacceptable condition resulted in the aborted landing, diverting to an alternate airport, or most commonly, accepting ATC vectors to initiate another approach. Many aborted landings are initiated by ATC or the cockpit crew due to traffic on the runway. In most cases a prior arrival failed to clear the runway in a timely manner, but a delayed take-off by an aircraft sitting in position at the threshold can also result in an aborted landing.

After touching down on the runway, during the landing and/or rollout phase, the pilot uses reverse thrust, ground spoilers, and wheel braking to decelerate to taxi-speed and vacate the runway. After exiting the runway, the First Officer may contact ground control for taxi-in instructions, completes the after landing-taxi checklist and calls the local ramp control to confirm the arrival gate assignment and occupancy status. During the taxi-in phase, the pilots may use taxiway charts of the destination airport to assist in the execution of taxi clearances given to them by ATC. If the arrival gate is occupied, the aircraft may be required to wait out the delay at a remote location. Occupied gates are often the result of a delayed departure or other operational issues with the aircraft currently positioned at the gate and the anticipated delay should be passed on to ATC and the passengers. Some stations utilize automatic parking systems which employ an arrangement of lights and/or signs that the Captain uses for lead-in line and stopping position guidance.

The source device of the network message is determined at step 305 and the destination device is determined at step 307. In some embodiments, the source and/or destination device may be one or more various avionic devices within an aviation network, such as those devices described in FIG. 1B. In other embodiments, the source and/or destination device may be a process, application, device, and/or operating system (OS). As previously described, a functional network flow, and network messages included therein, may be uniquely identified by the following parameters within a certain time period: source and destination IP address, source and destination port, and layer 4 protocol. In some embodiments, a firewall, such as firewall 112 may inspect the transmitted network packets to determine if the packet matches the firewall's set of filtering rules based on information contained in the packet, such as a combination of the packet's source and destination address, its protocol, and, for TCP and UDP traffic, the port number.

In some embodiments, the firewall may be a network layer firewall, a packet filter, an application layer firewall, and/or any combination thereof. In some embodiments, the firewall may be a stateless firewall that does not determine whether a packet is part of an existing stream of traffic (e.g. it stores no information on connection "state") and only filters each packet based only on information contained in the packet itself. In other embodiments, the firewall may be a stateful firewall, which can maintain context about active sessions, and use that "state information" to speed packet processing. For example, an existing network connection, such as that represented by arrow A in FIG. 1B, may be described by several properties, including source and destination IP address, UDP or TCP ports, and the current stage of the connection's lifetime (including session initiation, handshaking, data transfer, or completion connection). If a network packet does not match an existing connection, it will be evaluated according to the ruleset for new connections. If a packet matches an existing connection based on comparison with the firewall's state table, it may be allowed to pass without further processing.

At step 309, the contents of the data field of the network message are identified to determine whether the network message, which is sent from the source device and directed to the destination device, is acceptable when the system is in the current context. In further embodiments, the firewall may incorporate be programmed with deep packet filtering rules to perform deep packet inspection (DPI) of the received network packets. In some embodiments, such firewall enabled with deep packet inspection abilities may have the ability to look at Layer 2 and beyond Layer 3 of the OSI model. In some cases, DPI can be invoked to look through Layer 2-7 of the OSI model, including headers and data protocol structures, as well as the payload of the network message. DPI functionality is invoked when a device looks or takes other action, based on information beyond Layer 3 of the OSI model. In some embodiments, DPI can identify and classify traffic based on a signature database that includes information extracted from the data part of a packet, allowing finer control than classification based only on header information. In some embodiments, the network message may be further examined by the firewall, such as through deep packet inspection, to identify and/or define additional attributes of the received network message. In various embodiments, such attributes may include device state, flight phase, function, sub-function, data flow, and/or protocol. In some embodiments, such attributes may correspond to the header and data fields of the network packets and indicate the type of action initiated by a network message.

In some embodiments, the action initiated by a network message may be various application based actions, such as open, print, copy, start, write, and/or communicate with. In other embodiments, other actions may be initiated by a network message. In some embodiments, such actions of the network message may be associated with a device state and/or corresponding flight phases. As previously described, such flight phases may include, but not limited to, pre-flight; engine start; in-gate; taxi-out; takeoff; initial climb; climb; enroute cruise; descent; approach land; rollout; taxi-in; go around; and engine shutdown. In some embodiments, one or more of such flight phases may correspond to a device state, such as operational mode, maintenance mode, or data load mode.

In some embodiments, the function, sub-function, and data flow of a network message may categorize the message carried by the network message and/or an action initiated by the network message. For example, functions of a network message may include wireless dataload, central maintenance and computing functions ("CMCF") printing jobs, etc. Other functional flows of major aircraft functions may further include flight management, thrust management, and/or aircraft condition monitoring. Such functional flows may contain sub-functions, which can also be described as different data flows. In various embodiments, the sub-function of a network message may be a particular implementation of the function of the network message. For example a wireless dataload function may include sub-functions such as IEEE 802.1x, 615A, Config Report, Print Request, etc.

In some embodiments, the data flow of a network message may describe the specific action initiated by the network message. In some embodiments, the data flow may be either temporal or protocol exchange. For example, functional flows including wireless dataload and printing jobs are protocol exchanges. 802.1x authentication and/or authorization is another example of a protocol data flow exchange. Airspeed and/or altitude data flows are an example of temporal data flows. Central maintenance computing functions may include both temporal and protocol exchange data flows. For example, a continuous build in test equipment ("BITE") reporting, which does not establish a session is a temporal data flow. Similarly, a functional status that is posted from the established member system list is a temporal data flow. Another temporal data flow may be functions that queue for data from the established member system list. However, a query of line replaceable unit ("LRU") status from CMCF is a protocol data flow.

For example, a network message may be an action to upload software to an avionics device, such as a network message 4 shown in Table 1 below. Such a network message may only be allowed when the system is in a data load mode, such as when the aircraft is in an in-gate flight phase. Such a network message may further include a "Wireless Dataload" function, a "615A" sub-function, a "Transfer Data" data flow, and a TFTP protocol. Further examples of possible network messages are shown below in Table 1.

TABLE 1

Example Classified Functional Network Flow Table

| # | Flight Phase | Function | Sub-Function | DataFlow | Protocol | Message |
|---|---|---|---|---|---|---|
| 1 | Unknown | FMC | Airdata | Altitude | N/A | SRC ADDR1 DST ADDR3 PORT A: MSG1 |
| 2 | Power-On | FMC | Airdata | Airspeed | N/A | SRC ADDR1 DST ADDR3 PORT A: MSG2 |
| 3 | Preflight | Dataload | IEEE 802.1x | ML Authentication Request | N/A | SRC ADDR4 DST ADDR2 PORT A MSG1 |
| 4 | Preflight | Dataload | IEEE 802.1x | ML Authentication Granted | N/A | SRC ADDR2 DST ADDR4 PORT A MSG1 |

TABLE 1-continued

Example Classified Functional Network Flow Table

| # | Flight Phase | Function | Sub-Function | DataFlow | Protocol | Message |
|---|---|---|---|---|---|---|
| 5 | Preflight | Dataload | IEEE 802.1x | ML Request CMC Dataload by ONS | N/A | SRC ADDR4 DST ADDR2 PORT B MSG2 |
| 6 | Preflight | Dataload | 615A | Establish Session Request | N/A | SRC ADDR2 DST ADDR3 PORT C MSG1 |
| 7 | Preflight | Dataload | 615A | Establish Session Grant | N/A | SRC ADDR3 DST ADDR2 PORT C MSG1 |
| 8 | Preflight | Dataload | 615A | Transfer Data | TFTP protocol | SRC ADDR2 DST ADDR3 PORT A: MSG2 |
| 9 | Preflight | Dataload | 615A | Transfer Data | TFTP protocol | SRC ADDR2 DST ADDR3 PORT A: MSG2 |
| 10 | Preflight | Dataload | 615A | Transfer Data | TFTP protocol | SRC ADDR2 DST ADDR3 PORT A: MSG2 |
| 11 | Preflight | Dataload | 615A | Transfer Data | TFTP protocol | SRC ADDR2 DST ADDR3 PORT A: MSG2 |
| 12 | Preflight | Dataload | 615A | Close Session | N/A | SRC ADDR2 DST ADDR3 PORT A: MSG2 |
| 13 | Preflight | Printing | Print Request | Establish Session | N/A | SRC ADDR2 DST ADDR5 PORT A: MSG1 |
| 14 | Preflight | Printing | Print Request | Print | N/A | SRC ADDR2 DST ADDR5 PORT A: MSG2 |
| 15 | Preflight | CMCF | Config Report | Request Report | N/A | SRC ADDR3 DST ADDR1 PORT A: MSG2 |
| 16 | Preflight | CMCF | Config Report | Send Report | N/A | SRC ADDR1 DST ADDR3 PORT A: MSG3 |
| 17 | Preflight | CMCF | BITE Report | Request Report | N/A | SRC ADDR3 DST ADDR1 PORT A: MSG2 |
| 18 | Preflight | CMCF | BITE Report | Send Report | N/A | SRC ADDR2 DST ADDR3 PORT A: MSG3 |
| 19 | Taxi Out | FMC | Airdata | Altitude | N/A | SRC ADDR1 DST ADDR3 PORT A: MSG1 |
| 20 | Taxi Out | FMC | Airdata | Airspeed | N/A | SRC ADDR1 DST ADDR3 PORT A: MSG2 |
| 21 | TakeOff | FMC | Airdata | Altitude | N/A | SRC ADDR1 DST ADDR3 PORT A: MSG1 |
| 22 | TakeOff | FMC | Airdata | Airspeed | N/A | SRC ADDR1 DST ADDR3 PORT A: MSG2 |
| 23 | Initial Climb | FMC | Airdata | Altitude | N/A | SRC ADDR1 DST ADDR3 PORT A: MSG1 |
| 24 | Initial Climb | FMC | Airdata | Airspeed | N/A | SRC ADDR1 DST ADDR3 PORT A: MSG2 |
| 25 | Climb | FMC | Airdata | Altitude | N/A | SRC ADDR1 DST ADDR3 PORT A: MSG1 |
| 26 | Climb | FMC | Airdata | Airspeed | N/A | SRC ADDR1 DST ADDR3 PORT A: MSG2 |
| 27 | EnRoute Cruise | FMC | Airdata | Altitude | N/A | SRC ADDR1 DST ADDR3 PORT A: MSG1 |
| 28 | EnRoute Cruise | FMC | Airdata | Airspeed | N/A | SRC ADDR1 DST ADDR3 PORT A: MSG2 |

TABLE 1-continued

Example Classified Functional Network Flow Table

| # | Flight Phase | Function | Sub-Function | DataFlow | Protocol | Message |
|---|---|---|---|---|---|---|
| 29 | Descent | FMC | Airdata | Altitude | N/A | SRC ADDR1<br>DST ADDR3<br>PORT A: MSG1 |
| 30 | Descent | FMC | Airdata | Airspeed | N/A | SRC ADDR1<br>DST ADDR3<br>PORT A: MSG2 |
| 31 | Approach/Landing | FMC | Airdata | Altitude | N/A | SRC ADDR1<br>DST ADDR3<br>PORT A: MSG1 |
| 32 | Approach/Landing | FMC | Airdata | Airspeed | N/A | SRC ADDR1<br>DST ADDR3<br>PORT A: MSG2 |
| 33 | Rollout | FMC | Airdata | Altitude | N/A | SRC ADDR1<br>DST ADDR3<br>PORT A: MSG1 |
| 34 | Rollout | FMC | Airdata | Airspeed | N/A | SRC ADDR1<br>DST ADDR3<br>PORT A: MSG2 |
| 35 | Taxi In | FMC | Airdata | Altitude | N/A | SRC ADDR1<br>DST ADDR3<br>PORT A: MSG2 |
| 36 | Taxi In | FMC | Airdata | Airspeed | N/A | SRC ADDR1<br>DST ADDR3<br>PORT A: MSG2 |
| 37 | Engine Shutdown | FMC | Airdata | Altitude | N/A | SRC ADDR1<br>DST ADDR3<br>PORT A: MSG1 |
| 38 | Engine Shutdown | FMC | Airdata | Airspeed | N/A | SRC ADDR1<br>DST ADDR3<br>PORT A: MSG2 |

Table 1 contains possible network messages that may be transferred between system 110, system 114, and/or other computer systems, LRU's, and/or devices in a networked aviation platform. As shown in Table 1, messages 3 to 12 are associated with a Dataload action during a preflight flight phase and have been identified with a Dataload function. Such Dataload action corresponds to a dataload of the Central Maintenance Computer (CMC) LRU by the On Board Network System (ONS) performed by a wireless Maintenance Laptop (ML), such as Maintenance Laptop 126. As previously described, data loading functions may be maintenance actions only allowed in maintenance mode when the aircraft is on the ground, such as during the in-gate flight phase and/or taxi-out flight phase. In some embodiments, a wireless dataload function may include operations to exchange data files between loadable targets. Such operations may include discovery of available loadable targets on a network, querying current configurations of loadable targets, loading new or updated software and configuration files to loadable targets, downloading data files from loadable targets, etc.

A sub-function of the dataload action for messages 3 to 5 have been identified as IEEE 802.1x. The IEEE 802.1x standard for port-based network access control (PNAC) defines the encapsulation of the extensible authentication protocol (EAP) over IEEE 802, also known as EAP over LAN (EAPOL). For example, functional network flows 3, 4, and 5 include IEEE 802.1x sub-functions. As further depicted in Table 1, Data Flow of message 3 has been identified as an ML Authentication Request from source address 4, corresponding to maintenance laptop (ML) 126, to destination address 2, corresponding to On-Board Network System (ONS) 122. The Data Flow of network message 4 has been classified as an ML Authorization Grant from ONS 122 to ML 126, to initiate a wireless dataload. The Data Flow of network message 5 has been identified as an ML Request CMC Dataload by ONS from ML 126 to ONS 122 to an additional Port B at ONS 122.

In other embodiments, the sub-function of a network message for a wireless dataload function may be the ARINC 615A standard, which is used for data loading operations on aircraft over various types of networks, such as Ethernet, Controller Area Network (CAN), and/or ARINC 664, In some embodiments, software utilizing the 615A standard may perform uploads, batch uploads, downloads, search, and information data loading operations for one or more targets. For example, network messages 6 to 12 in Table 1 have been identified to include 615A sub-function the Dataload function. Functional network flow 6 further includes an Establish Session Request data flow, which may initiate an interactive information interchange between devices, such as systems 110 and 114, in certain embodiments. The Establish Session Request is sent from source address 2, corresponding to ONS 122, to destination address 3, corresponding to CMC 124. Network message 7 includes an Establish Session Grant data flow sent from CMC 124 to ONS 122, Network message 8 further includes a Transfer Data data flow, which may initiate downloading and/or uploading of data between the ONS 122 and CMC 124 devices. In some embodiments, such downloading and/or uploading may utilize a Trivial File Transfer Protocol (TFTP) and the protocol of network message 8 is identified as such. Network messages 9, 10, and 11 similarly include Transfer Data data flows utilizing TFTP protocol between the ONS 122 and CMC 124. In other embodiments, other protocols may be implemented in wireless dataload operations. Lastly, network message 12 includes a Close Session request, which may end the interactive information interchange between the ONS 122 and CMC 124 devices after data has been completely downloaded and/or uploaded between the devices, in certain embodiments.

Messages 13 and 14 are also identified as corresponding to the preflight flight phase, and are associated with a printer action. As shown in Table 1, messages 13 and 14 and have been identified with a Printing function. Network messages 13 and 14 further include sub-functions identified as Print Request, which may be correspond to a request for a printout of the dataload established through functional network flows 6 to 12, in certain embodiments. Network message 13 includes an Establish Session data flow, which may initiate an interactive information interchange between devices, such as ONS 122 and printer 130. Functional Network flow 13 includes a Print data flow classification for Data flow002, which may initiate printing of the report, at printer 130.

As another example, the function of a message may be a central maintenance control function (CMCF). As depicted in Table 1, network messages 15 to 18 have been identified with a CMCF Function, which may indicate a maintenance report request. In certain embodiments, a central maintenance control ffinction may initiate and/or receive communication with an aircraft's onboard maintenance system in order to isolate faults and guide appropriate maintenance actions through centralized fault reporting. In some embodiments, a CMCF may also allow fault report consolidation, message association and flight deck effect (FDE) correlation.

Messages 15 and 16 are associated with a CMC configuration report. As shown in Table 1, network messages 15 and 16 have been identified with a Config. Report Sub-Function. Network message 15 includes a Request Report Data Flow from CMC 124 to FMC 120, requesting a configuration report. Subsequently, network message 16 includes a Send Report Data Flow from FMC 120 to CMC 124.

Messages 17 and 18 are associated with a CMC BITE report. As shown in Table 1, network messages 17 and 18 have been identified with a BITE Report Sub-Function. BITE (Built-In Test Equipment) is characterized primarily as a passive fault management and diagnosis built into airborne systems to support the maintenance process. Built-in test equipment may refer to multimeters, oscilloscopes, discharge probes, and frequency generators that are provided as part of the system to enable testing and perform diagnostics. Network message 17 includes a Request Report Data Flow from CMC 124 to Flight Management Computer 112, which may correspond to a request for a diagnostic of the FMC 120. Subsequently, network message 18 includes a Send Report Data Flow from ONS 122 to CMC 124, providing a diagnostic report to the CMC 124.

Remaining network messages 1, 2, and 19 to 38 are identified with a FMC Airdata Function. The FMC, such as Flight Management Computer 120 shown in FIG. 1B, is a specialized computer system that automates a wide variety of in-flight tasks, reducing the workload on the flight crew. A primary function of the FMC is in-flight management of the flight plan. Using various sensors, such as GPS and an inertial navigation system (INS) often backed up by radio navigation, to determine the aircraft's position, the FMS can guide the aircraft along the flight plan. These network messages further include an Altitude Data Flow and an Airspeed Data Flow which may indicate the altitude and airspeed of an aircraft, respectively. Such data flows are sent from source address 1, corresponding to the flight management computer (FMC) 120, to a destination source 3, corresponding to a CMC 124.

At step 310, the system determines whether the message sent from the source device and directed to the destination device is acceptable when the system is in the current context. By using deep packet inspection capabilities, the system may identify the data of the network message and reference the filter rules to determine if a certain entity (source device) may take a particular action (network message data and attributes) on another entity (destination device) during the particular context (location, time of day, device state, flight phase, etc.). As previously described, an entity may refer to one or more various avionic devices within an aviation network, such as that described in FIGS. 1A and 1B. In some embodiments, an entity may be a collection of one or more such avionic devices. The output of this context aware process may include a rich set of questions, such as: who has authority (what (source) entity, role constraint), what are they allowed to do (action constraint), from where can they do it (location constraint), when can they do it (time constraint), how can they do it (protocol API constraint), and to whom can they do it (what (destination) entity). Such constraints may be enforced by utilizing context based controls, the results of which can be thought of as context-aware authorization. While current firewall rules can be reduced to whether a first device may communicate with a second device using a certain protocol, the context-aware filtering can be described as whether a first entity can take a particular action on a second entity in a particular context. The contest-aware based controls provide a much fuller set of control which restricts communication between two entities.

At step 311, the network message is forwarded to the destination device if it is determined that the network message, which is sent from the source device and directed to the destination device, is acceptable when the system is in the current context. If the network message is not acceptable the network message is not forward to the destination device. At step 312, the system determines whether the network message is the final network message. If the network message is not the final network message transmitted within the system, another message is received at step 301. If the network message is the final network message transmitted within the system, then, the method ends at step 313.

Figure 3B:
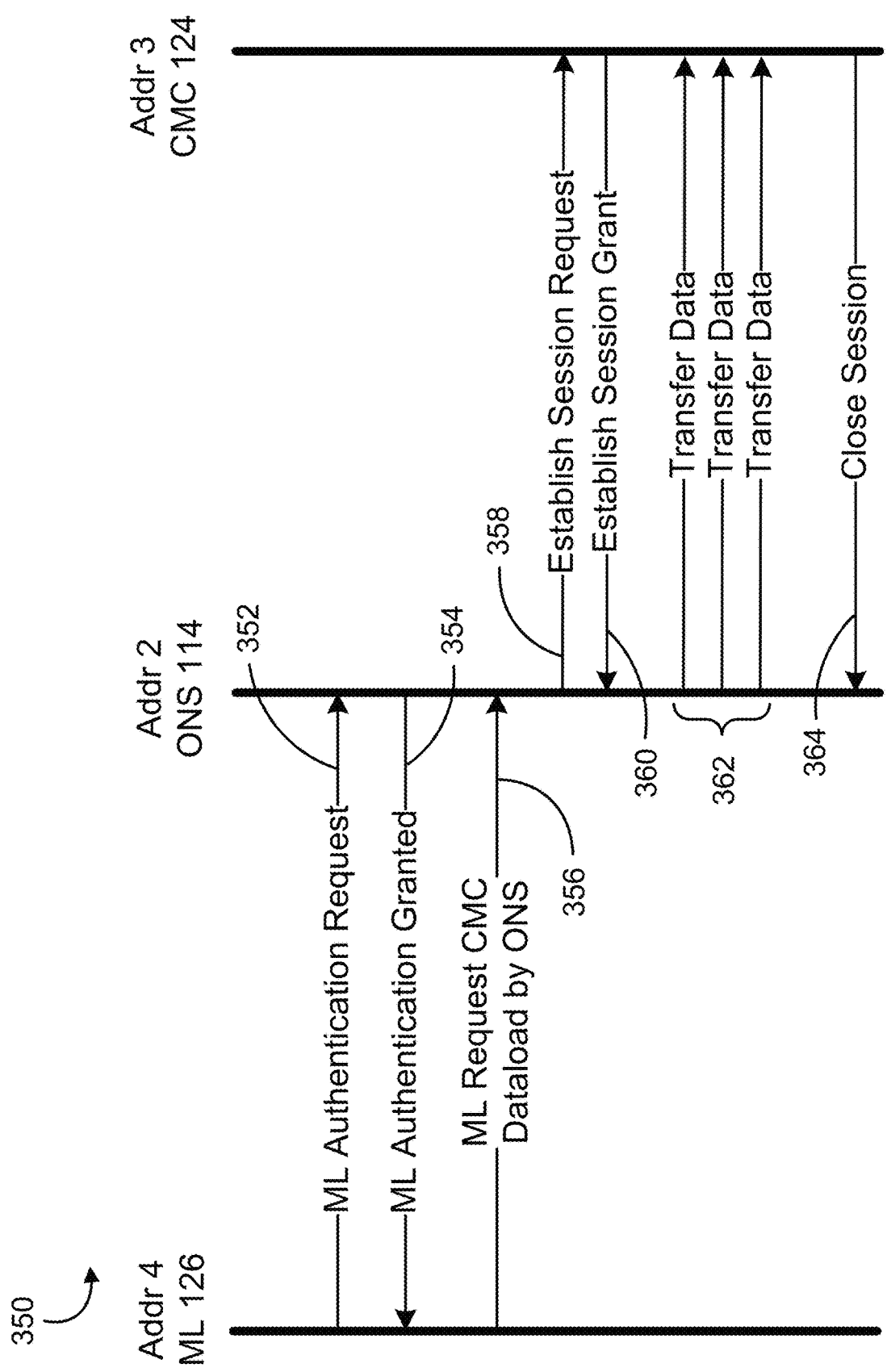
FIG. 3B illustrates a sequence of events for performing a wireless data load of a Central Maintenance Computer (CMC) via an On Board Network System (ONS), in accordance with one or more embodiments.
Figure 4A:
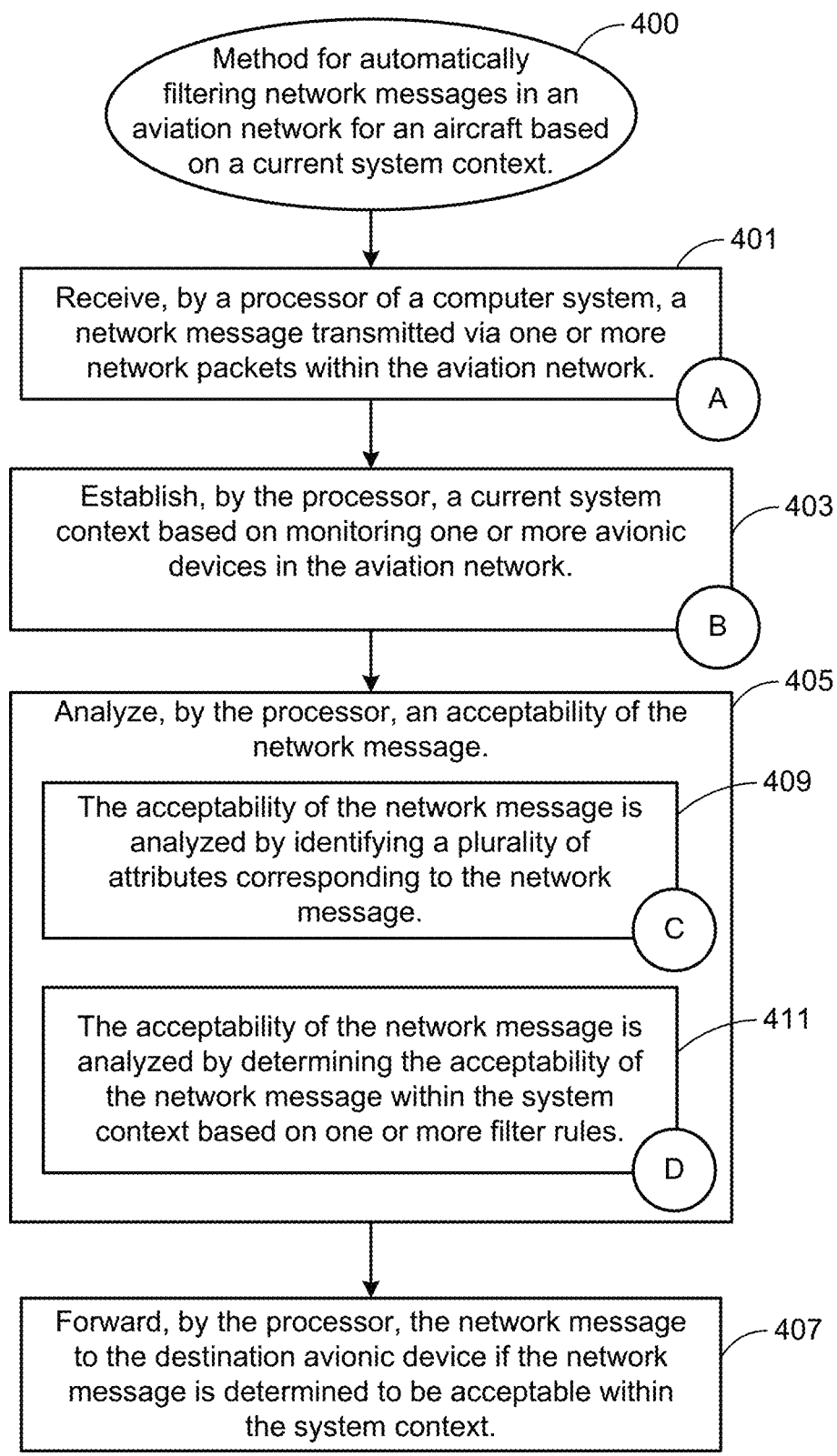
FIGS. 4A, 4B, 4C, and 4D illustrate another example of a method for context aware network filtering, in accordance with one or more embodiments.
Figure 4B:
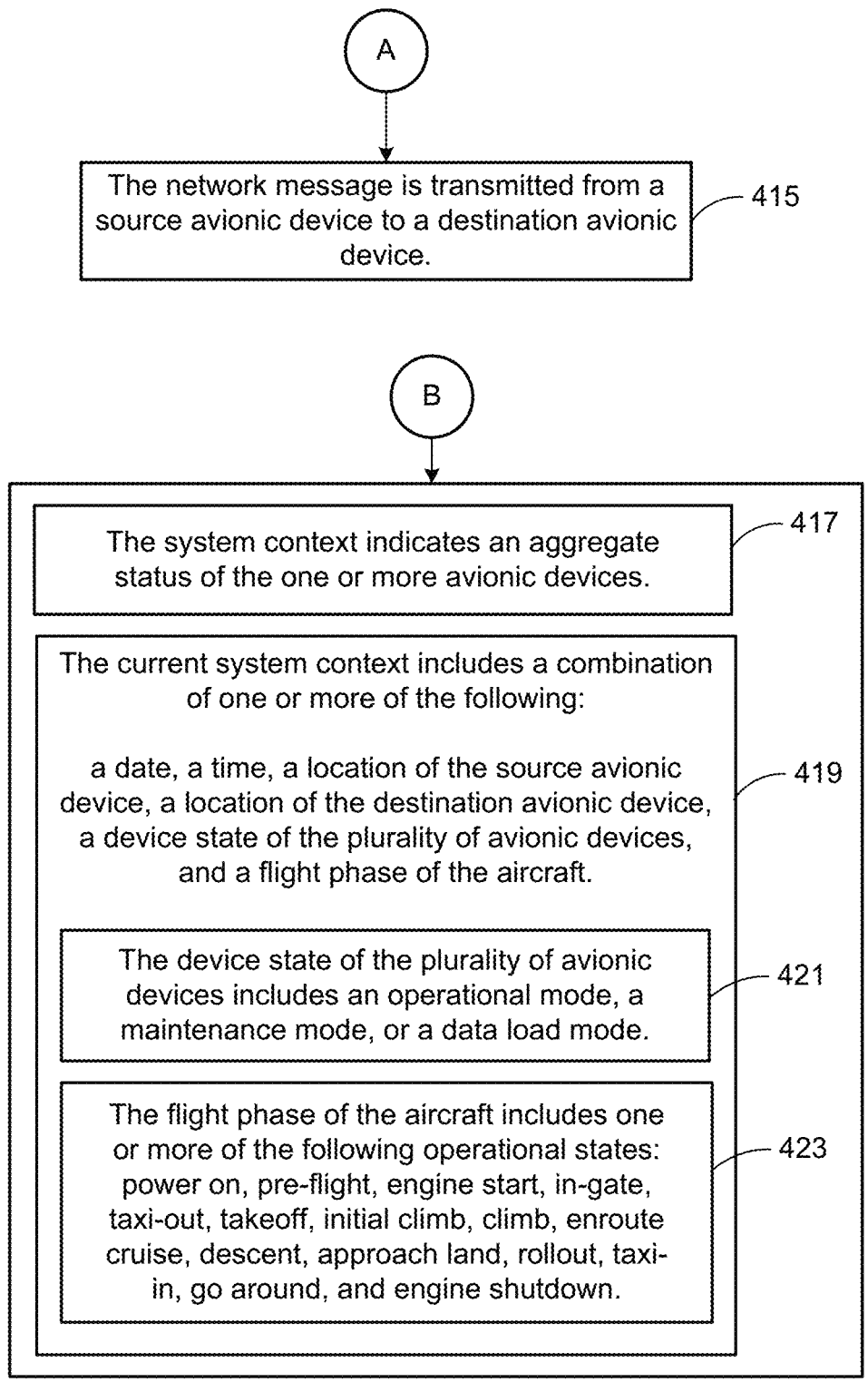
Figure 4C:
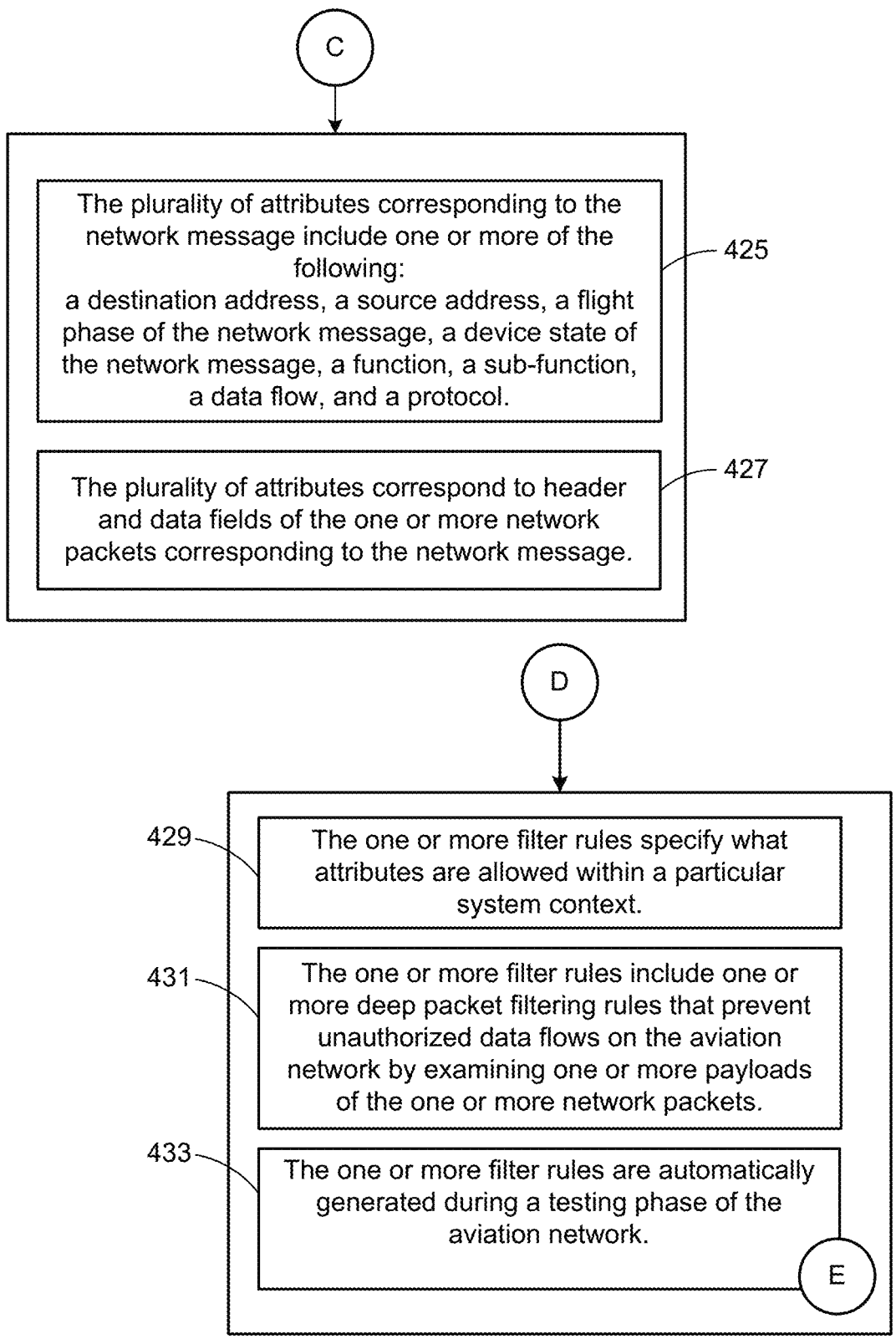
Figure 4D:
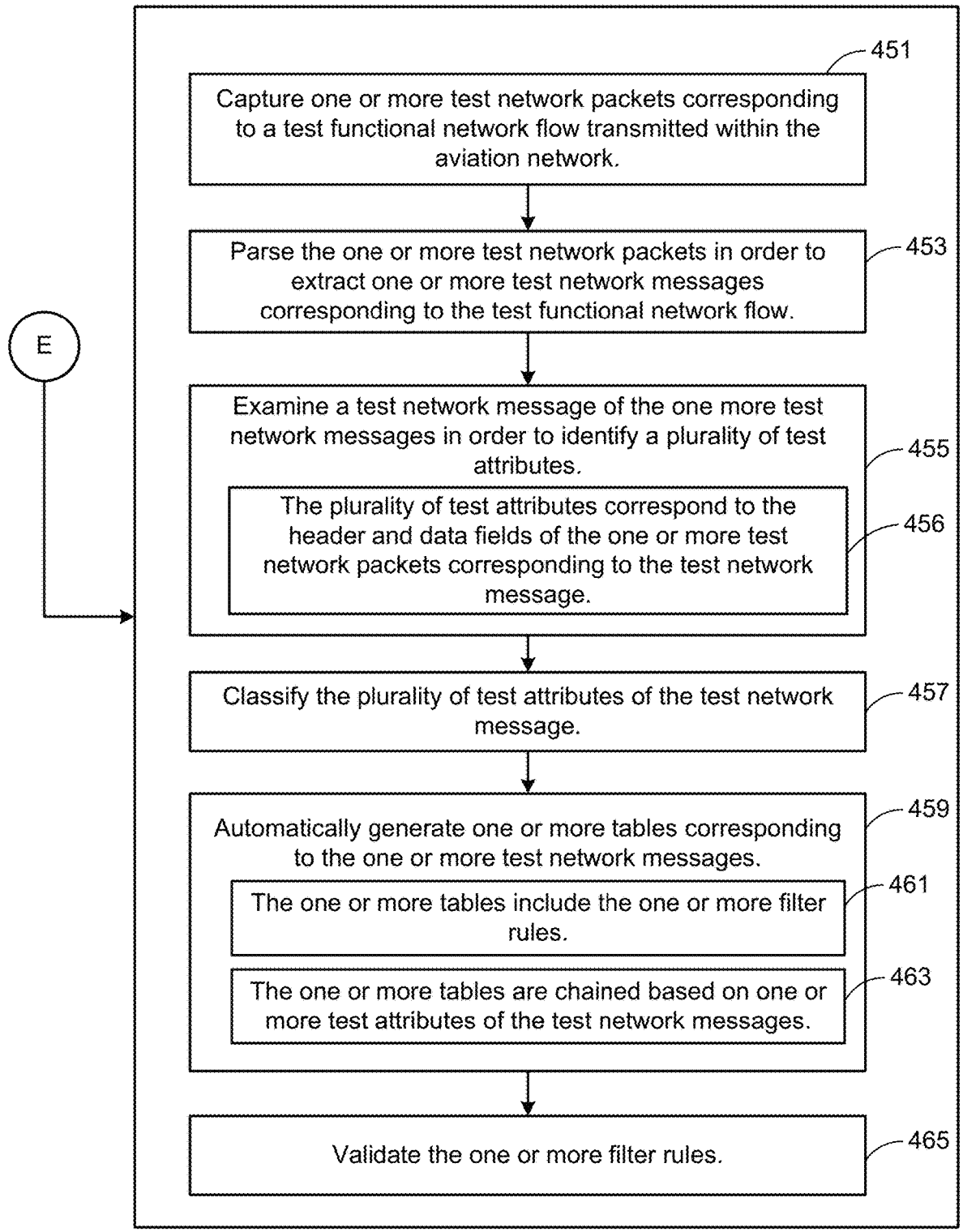

FIG. 3B illustrates a sequence 350 of events for performing a wireless data load of a Central Maintenance Computer (CMC) via an On Board Network System (ONS), in accordance with one or more embodiments. FIG. 3B depicts the context, and protocol steps for using a wireless maintenance laptop (ML) 126 to perform a wireless data load of a CMC 124 via an ONS 122. These steps correspond to network messages 3 to 12 in Table 1. The subject matter expert determines the key activities for each context to develop the context aware filter. For the example shown in FIG. 3B, the aircraft is in the preflight flight phase. In other embodiments, such steps may be performed by a computer system, such as computer 102 and/or server 106.

First the ML 126 is authorized by the ONS 122 at steps 352 to 356. Step 352 corresponds to network message 3 which is an ML Authentication Request from ML 126 to ONS 122. Step 354 corresponds to network message 4 which is an ML Authentication Grant from the ONS 122 to the ML 126. At step 356, the ML 126 then sends message 5 corresponding to an ML Request CMC Dataload by ONS, as described in FIG. 3A.

Once the Maintenance Laptop (ML) 126 has been wireless 802.1× authorized, a 615A session is established through steps 358 and 360. Step 358 corresponds to message 6 which is an Establish Session Request from the ONS 122 to the CMC 124. Step 360 corresponds to message 7 which is an Establish Session Grant from CMC 124 to ONS 122.

Step 362 corresponds to messages 8, 9, and 10 in which data is transferred from the ONS 122 to CMC 124 utilizing a TFTP protocol. For each message, the filter checks that the above conditions have been met and then it can allow the message to pass between the systems, such as in step 310 in FIG. 3A.

Flight phase is just one parameter which can be used to determine the context of a system. Alternatively, as the system is performing a sequence of operations each prior step can be used as the context to determine if the message meets the requirements for the next step. For the Airspeed and Altitude messages (network message 1, 2, and 19 to 38), there is no limitation about which flight phase the message can pass, so the filter rules for these messages are like standard IP table like rules which is based on Source address, Destination Address, port and protocol.

FIG. 4A, FIG. 4B, FIG. 4C, and FIG. 4D illustrate an additional method 400 for automatically filtering network messages in an aviation network for an aircraft based on a current system context, in accordance with one or more embodiments. As in step 301, a network message 415 is received at step 401 by a processor of a computer system, such as processor 501 further described below. The network message 415 is transmitted via one or more network packets within the aviation network. The network message 415 is transmitted from a source avionic device to a destination avionic device. In some embodiments, the source avionic device and/or destination avionic device may comprise various different avionic devices, such as computers 102 and 106, or the various LRUs within system 110 and/or system 114.

At step 403, a current system context 419 is established by the processor based on monitoring one or more avionic devices in the aviation network, such as in step 303. In some embodiments, the system context 419 may indicate the aggregate status 417 of the one or more avionic devices. In some embodiments, the current system context 419 includes a combination of one or more of the following: a date, a time, a location of the source avionic device, a location of the destination avionic device, a device state 421 of the plurality of avionic devices, and a flight phase 423 of the aircraft. In some embodiments, the device state 421 of the plurality of avionic devices may include an operational mode, a maintenance mode, or a data load mode. In some embodiments, the flight phase 423 of the aircraft may include one or more of the following operational states: power on, pre-flight, engine start, in-gate, taxi-out, takeoff, initial climb, climb, enroute cruise, descent, approach land, rollout, taxi-in, go around, and engine shutdown. For example, a current system context 419 may be in an operational mode on Feb. 28, 2015 at 1300 hours with an aircraft making an initial climb in a climb flight phase communicating with Air Traffic Control (ATC) on the ground. As previously described in conjunction with FIGS. 3A-3B, various network messages 415 may be allowed and/or prohibited during the various flight phases 419.

At step 405, an acceptability of the network message 415 is analyzed by the processor, such as in steps 305, 307, 309, and 310. The acceptability of the network message 415 is analyzed by identifying (409) a plurality of attributes 425 corresponding to the network message 415. In some embodiments, the plurality of attributes 425 corresponding to the network message 415 may include one or more of the following: a destination address, a source address, a flight phase of the network message, a device state of the network message, a function, a sub-function, a data flow, and a protocol. In some embodiments, the plurality of attributes 425 correspond to header and data fields 427 of the one or more network packets corresponding to the network message 415. As previously described in step 309, a computer system running a firewall program, such as firewall 112 may identify the attributes by utilizing deep packet investigation or stateful filtering.

The acceptability of the network message 415 is further analyzed by determining (411) the acceptability of the network message 415 within the system context 419 based on one or more filter rules 429. The one or more filter rules 429 specify what attributes 425 are allowed within a particular system context. In various embodiments, filter rules 429 specify the allowable attributes 425 for various system contexts, including the current system context 419. The other various system contexts may, in turn, become the current system context 419 depending on changes in the date, the time, the location of the source avionic device, the location of the destination avionic device, the device state (421) of the plurality of avionic devices, the flight phase (423) of the aircraft, and/or any other operation within the aviation network. In one embodiment, a particular system context may be the current system context 419. In some embodiments, the one or more filter rules 429 may include one or more deep packet filtering rules 431 that prevent unauthorized data flows on the aviation network by examining one or more payloads of the one or more networked packets, as described in FIGS. 3A-3B. At step 407, the network message 415 is forwarded by the processor to the destination avionic device if the network message 415 is determined to be acceptable within the system context 419, such as in step 311.

In some embodiments, the one or more filter rules 429 may be automatically generated (433) during a testing phase of the aviation network. According to various embodiments, the one or more filter rules 429 may be automatically generated (433) by capturing (451) one or more test network packets corresponding to a test functional network flow transmitted within the aviation network. The one or more test network packets are then parsed (453) in order to extract one or more test network messages corresponding to the test functional network flow. A test network message of the one or more network messages may then be examined (455) in order to identify a plurality of test attributes 456. In some embodiments, the plurality of test attributes 456 may correspond to header and data fields of the one or more test network packets corresponding to the test network message. In some embodiments, the test network messages may be network messages 415 and the attributes of the test network message may be attributes 425.

The plurality of test attributes of the test network message may then be classified (457). In some embodiments, classifying (457) the plurality of test attributes may include searching one or more sources to retrieve previously classified attributes corresponding to predetermined network flows. In some embodiments, the one or more sources may include local storage or global databases accessed through a global network. In some embodiments, predetermined functional network flows may have been previously classified by one or more users. In some embodiments, the predetermined classifications may be included in one or more classification files. In other embodiments, classifying (457) the plurality of test attributes may additionally, or alternatively, include prompting a user to input a classification for one or more identified test attributes. In some embodiments, prompting a user may include prompting a user to select one or more classifications from a list of most relevant selections. In some embodiments, the relevant selections may be ranked based on similarities of network flows and/or attributes to the test network flow and/or test attributes 456). Examples of classified network flows are shown in Table 1.

In some embodiments, the one or more filter rules 429 are further automatically generated (433) by automatically generating (459) one or more tables 461 corresponding to the one or more test network messages. In some embodiments, the one or more tables 461 may include the one or more filter rules 429. In other embodiments, the one or more tables 461 may be chained (463) based on one or more test attributes of the test network messages. In some embodiments, the tables 461 may be organized by the flight phase of the test network messages. In some embodiments, the one or more filter rules 429 are then validated (465). In some embodiments, the one or more filter rules 429 may be validated by automatically comparing them to an existing classification file or other knowledge base.

In some embodiments, as each test network message is classified (457), a filter rule 429 is generated for each classified test network message. In some embodiments, the generated filter rules 429 may be a discretionary access control (DAC) rule. In some embodiments, each DAC rule is based on a classified test network flow. In some embodiments, the DAC rules may be IPtables rules used in Linux tables. IPtables may refer to a user-space application program that allows a system administrator to configure the tables provided by the Linux kernel firewall (implemented as different Netfilter modules) and the chains and rules it stores. Different kernel modules and programs are currently used for different protocols; iptables applies to IPv4, ip6tables to IPv6, arptables to ARP, and ebtables to Ethernet frames. In some embodiments, other types of filter rules may be generated based on the classified network flows, such as ip6tables, arptables, and ebtables.

In some embodiments, each functional/data flow can generate IP filter rules 429 for both the outbound and inbound filters on a per mode basis. This is relevant for particular rules, such as filter rules for Dataload messages (network messages 3 to 12 in Table 1) or CMC Report messages (network messages 15 to 18 in Table 10, which are dependent on flight phase to indicate system context. Other messages, such as the Altitude and Airspeed messages (network messages 1, 2, and 19 to 38 in Table 1) are agnostic to the flight phase. In some embodiments, these filters may be rich enough to address each functional/data flow distinctly. In some embodiments, such IP filter rules 429 can be extended to capture stateful behavior by chaining the simple IPtable rules, or stateless filter rules. For example, a sequence protocol diagram may be created at the sub-function level, such as 802.1x transactions. In various embodiments, the stateful IP filter rules 429 can establish minimum and maximum bounds for rules that have a range of operating values, such as length of the packet, gross level IP Destination/Source (DA/SA) address space, Port DA/SA, etc. In some embodiments, such rules 429 can be extended to a more targeted bound once the stateful behavior is taken into account where simple IP rules are chained. A firewall, such as firewall 112 may use stateful IP filter rules 429 to track the operating state and characteristics of network connections traversing it, and may be able to hold significant attributes of each connection in memory. Such attributes may be collectively known as the state of the connection, and may include such details as the IP addresses and ports involved in the connection and the sequence numbers of the packets traversing the connection. In some embodiments, stateful inspection by a firewall may monitor incoming and outgoing packets over time, as well as the state of the connection, and stores the data in dynamic state tables. In some embodiments, such cumulative data is evaluated, so that filtering decisions would not only be based on administrator-defined rules, but also on context that has been built by previous connections as well as previous packets belonging to the same connection.

Figure 5:
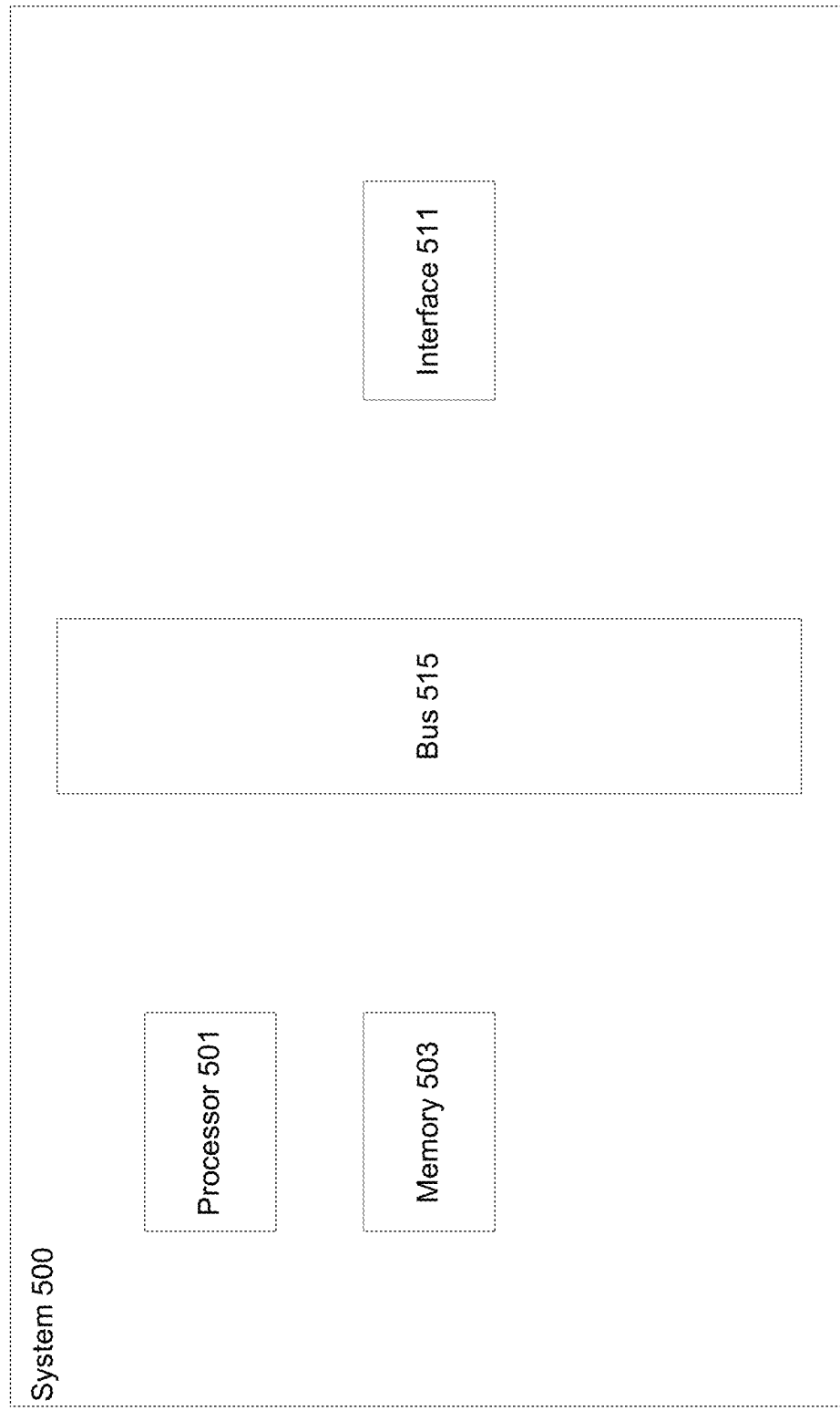
FIG. 5 is a block diagram illustrating an example of a system capable of implementing various processes described in the present disclosure.

FIG. 5 is a block diagram illustrating an example of a system 500 capable of implementing various processes described in the present disclosure. In some embodiments, system 500 may be a client device, such as computer 102 and/or computer 106, and one or more embodiments may be implemented in the form of a non-transitory computer readable medium storing one or more programs. According to particular embodiments, a system 500, suitable for implementing particular embodiments of the present disclosure, includes a processor 501, a memory 503, an interface 511, and a bus 515 (e.g., a PCI bus or other interconnection fabric) and operates as a streaming server. In some embodiments, when acting under the control of appropriate software or firmware, the processor 501 is responsible for receiving network messages transmitted within a networked aviation system (such as in step 401), determining a current system context (such as in step 403), analyzing the acceptability of the network message (such as in step 405), and/or forwarding an acceptable network message (such as in step 407). In other embodiments, processor 501 may be responsible for receiving user input and generating (433) filter rules. Various specially configured devices can also be used in place of a processor 501 or in addition to processor 501. In other embodiments, system 500 may also include one or more of the following elements: a pump, a timing element, a heating element, a thermostat, and a concentration detector.

The interface 511 is typically configured to send and receive data packets or data segments over a network, such as network 104. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions for operations including receiving network messages transmitted within a networked aviation system (such as in step 401), determining a current system context (such as in step 403), analyzing the acceptability of the network message (such as in step 405), and/or forwarding an acceptable network message (such as in step 407). In other embodiments, memory 503 may store data and program instructions of operations including receiving user input and generating (433) filter rules. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A method for automatically generating one or more filter rules during a testing phase of an aviation network, the method comprising:
    capturing one or more test network packets corresponding to a test functional network flow transmitted within the aviation network;
    parsing the one or more test network packets in order to extract one or more test network messages corresponding to the test functional network flow;
    examining a test network message of the one or more test network messages in order to identify a plurality of test attributes, wherein the plurality of test attributes correspond to header and data fields of the one or more test network packets corresponding to the test network message;
    classifying the plurality of test attributes of the test network message;
    automatically generating one or more tables corresponding to the one or more test network messages,
        wherein the one or more tables include the one or more filter rules,
        wherein the one or more tables are chained based on one or more test attributes of the test network messages; and
    validating the one or more filter rules.

2. The method of claim 1, wherein the test functional network flow corresponds to higher level airplane functions, sub-functions, data flows, or protocols.

3. The method of claim 1, wherein the test functional network flow includes a sequence of packets form a source to a multicast group or a broadcast domain.

4. The method of claim 1, wherein the test functional network flow may be uniquely identified by one or more of the following parameters within a certain time period: source and destination IP address, source and destination port, and layer 4 protocol.

5. The method of claim 1, wherein the plurality of test attributes include one or more of the following:
    a destination address, a source address, a flight phase of the network message, a device state of the network message, a function, a sub-function, a data flow, and a protocol.

6. The method of claim 1, wherein one or more filter rules specify what attributes are allowed within a particular system context.

7. The method of claim 1, wherein the one or more filter rules include one or more deep packet filtering rules, wherein the one or more deep packet filtering rules prevent unauthorized data flows on the aviation network by examining one or more payloads of the one or more network packets.

8. A system for automatically generating one or more filter rules during a testing phase of an aviation network, the system comprising:
    one or more processors;
    memory; and
    one or more programs stored in the memory, the one or more programs including instructions for:
        capturing one or more test network packets corresponding to a test functional network flow transmitted within the aviation network;
        parsing the one or more test network packets in order to extract one or more test network messages corresponding to the test functional network flow;
        examining a test network message of the one or more test network messages in order to identify a plurality of test attributes, wherein the plurality of test attributes correspond to header and data fields of the one or more test network packets corresponding to the test network message;
        classifying the plurality of test attributes of the test network message;
        automatically generating one or more tables corresponding to the one or more test network messages,
            wherein the one or more tables include the one or more filter rules,
            wherein the one or more tables are chained based on one or more test attributes of the test network messages; and
        validating the one or more filter rules.

9. The system of claim 8, wherein the test functional network flow corresponds to higher level airplane functions, sub-functions, data flows, or protocols.

10. The system of claim 8, wherein the test functional network flow includes a sequence of packets form a source to a multicast group or a broadcast domain.

11. The system of claim 8, wherein the test functional network flow may be uniquely identified by one or more of the following parameters within a certain time period: source and destination IP address, source and destination port, and layer 4 protocol.

12. The system of claim 8, wherein the plurality of test attributes include one or more of the following:
    a destination address, a source address, a flight phase of the network message, a device state of the network message, a function, a sub-function, a data flow, and a protocol.

13. The system of claim 8, wherein one or more filter rules specify what attributes are allowed within a particular system context.

14. The system of claim 8, wherein the one or more filter rules include one or more deep packet filtering rules, wherein the one or more deep packet filtering rules prevent unauthorized data flows on the aviation network by examining one or more payloads of the one or more network packets.

15. A non-transitory computer readable medium comprising one or more programs configured for execution by a computer system for automatically generating one or more filter rules during a testing phase of an aviation network, the one or more programs including instructions for:

- capturing one or more test network packets corresponding to a test functional network flow transmitted within the aviation network;
- parsing the one or more test network packets in order to extract one or more test network messages corresponding to the test functional network flow;
- examining a test network message of the one or more test network messages in order to identify a plurality of test attributes, wherein the plurality of test attributes correspond to header and data fields of the one or more test network packets corresponding to the test network message;
- classifying the plurality of test attributes of the test network message;
- automatically generating one or more tables corresponding to the one or more test network messages,
- wherein the one or more tables include the one or more filter rules,
- wherein the one or more tables are chained based on one or more test attributes of the test network messages; and
- validating the one or more filter rules.

16. The non-transitory computer readable medium of claim 15, wherein the test functional network flow corresponds to higher level airplane functions, sub-functions, data flows, or protocols.

17. The non-transitory computer readable medium of claim 15, wherein the test functional network flow includes a sequence of packets form a source to a multicast group or a broadcast domain.

18. The non-transitory computer readable medium of claim 15, wherein the test functional network flow may be uniquely identified by one or more of the following parameters within a certain time period: source and destination IP address, source and destination port, and layer 4 protocol.

19. The non-transitory computer readable medium of claim 15, wherein the plurality of test attributes include one or more of the following:

a destination address, a source address, a flight phase of the network message, a device state of the network message, a function, a sub-function, a data flow, and a protocol.

20. The non-transitory computer readable medium of claim 15, wherein one or more filter rules specify what attributes are allowed within a particular system context.

* * * * *